United States Patent [19]

Loftus

[11] Patent Number: 5,176,450
[45] Date of Patent: Jan. 5, 1993

[54] FLUID TEMPERATURE MEASURING DEVICE

[75] Inventor: Peter Loftus, Derby, England
[73] Assignee: Rolls-Royce plc, London, England
[21] Appl. No.: 756,873
[22] Filed: Sep. 9, 1991

[30] Foreign Application Priority Data

Nov. 29, 1990 [GB] United Kingdom ............... 9026034

[51] Int. Cl.$^5$ ........................................... G01K 7/12
[52] U.S. Cl. ............................... 374/164; 73/768; 374/143; 374/179
[58] Field of Search .............. 374/138, 142, 143, 144, 374/147, 148, 163, 164, 178, 179, 181, 182, 183; 73/715, 720, 768; 136/207, 222

[56] References Cited

U.S. PATENT DOCUMENTS

| | | | |
|---|---|---|---|
| 3,007,988 | 11/1961 | Jaffee et al. | 374/144 |
| 4,130,019 | 12/1978 | Nitschke | 374/181 |
| 4,440,508 | 4/1984 | Haloburdo, Jr. et al. | 374/179 |
| 4,501,504 | 2/1985 | Urmenyi et al. | 374/164 |
| 4,586,829 | 5/1986 | Hübner et al. | 374/144 |
| 4,708,769 | 11/1987 | Burger et al. | |
| 4,744,246 | 5/1988 | Busta | 374/178 |
| 4,744,672 | 5/1988 | Tursky et al. | 374/178 |
| 4,808,009 | 2/1989 | Sittler et al. | 374/178 |
| 4,848,926 | 7/1989 | Jenkins | 374/163 |
| 4,945,770 | 8/1990 | Alvelid et al. | 73/768 |

FOREIGN PATENT DOCUMENTS 970593  7/1975  Canada ........................... 374/144
2129565  5/1984  United Kingdom .

Primary Examiner—William A. Cuchlinski, Jr.
Assistant Examiner—G. Bradley Bennett
Attorney, Agent, or Firm—Oliff & Berridge

[57] ABSTRACT

A fluid temperature measuring device (10) comprises a substrate (12) upon which is deposited a first insulating layer (14). A first metallic layer (16) is sputtered onto the first insulating layer (14), a second insulating layer (18) is deposited on the first metallic layer (16) and a second metallic layer (20) is sputtered onto the second insulating layer (18).

The second metallic layer (20) is thin and has a low heat capacity so that it responds quickly to changes in temperature of the fluid. The first metallic layer (16) is thin and is heated by supplying an electric current from an electrical power supply (22) to maintain the first metallic layer (16) at the same temperature as the second metallic layer (20).

The second metallic layer (20) is electrically connected to an electrical resistance measuring device (24) which detects temperature changes of the fluid by detecting corresponding changes of the electrical resistance of the second metallic layer (20).

17 Claims, 1 Drawing Sheet

FLUID TEMPERATURE MEASURING DEVICE

The present invention relates to a fluid temperature measuring device, particularly for measuring fast changing temperatures in gas streams.

There is a requirement to measure the temperature of gas streams flowing through gas turbine engines for flow diagnostic measurements and for control of gas turbine engine surge. Such a temperature measuring device has to sense rapid changes in the temperature of the gas stream, at frequencies up to and greater than the frequency at which a rotating blade passes a given point of the gas turbine engine.

In order to make a temperature measuring device respond quickly to temperature changes, the mass, or heat capacity, of the temperature measuring device has to be very small. However, this results in a very weak temperature measuring device which is not suitable for use in high velocity gas streams. If the temperature measuring device is supported by a mechanical structure, the mechanical structure conducts heat from the temperature measuring device preventing it from responding quickly to temperature changes in the gas stream.

The present invention seeks to provide a fluid temperature measuring device which overcomes the above mentioned problems.

Accordingly the present invention provides a fluid temperature measuring device comprising a substrate, a first insulating layer secured to the substrate, a first electrically conducting layer secured to the first insulating layer, a second insulating layer secured to the first electrically conducting layer, a second electrically conducting layer secured to the second insulating layer, the second electrically conducting layer is arranged in operation to contact a fluid, the first electrically conducting layer is arranged to be heated or cooled so that the first electrically conducting layer is maintained at substantially the same temperature as the second electrically conducting layer, the second electrically conducting layer is electrically connected to an electrical characteristic measuring device, the electrical characteristic measuring device detects temperature changes of the fluid by detecting corresponding changes of said electrical characteristic of the second electrically conducting layer.

The first electrically conducting layer may be electrically connected to an electrical source such that the first electrically conducting layer is heated by an electric current.

Alternatively the first electrically conducting layer may comprise two joined dissimilar metals such that the first electrically conducting layer is heated by an electric current of one polarity and is cooled by an electric current of opposite polarity.

A cooling means may be arranged to cool the substrate to maintain the substrate at a temperature less than the minimum temperature of the fluid.

Cooling air may be directed onto the substrate.

The first electrically conducting layer may be a thin metallic film.

The thin metallic film may comprise nickel/chromium or nickel.

The first and second insulating layers may comprise thin alumina films.

Alternatively the first and second insulating layers may comprise dipped polyimide resin.

The second electrically conducting layer may be a thin metallic film, the electrical characteristic measuring device detects temperature changes of the fluid by detecting corresponding changes of the electrical resistance of the second electrically conducting layer.

The thin metallic film may comprise nickel/chromium or nickel.

The second electrically conducting layer may comprise a thin metallic film of two joined dissimilar metals which form one junction of a thermocouple, the electrical characteristic measuring device detects temperature changes of the fluid by detecting corresponding changes of the electromotive force produced by the junctions of the two dissimilar metals.

The substrate may comprise silicon.

The substrate may be a silicon diaphragm containing strain gauge elements, the substrate being secured to and defining an evacuated cavity with a support member, the silicon diaphragm moves relative to the support member due to change in pressure of the fluid, the strain gauge elements detecting the pressure of the fluid by detecting movement of the silicon diaphragm.

The present invention will be more fully described by way of example, with reference to the accompanying drawings, in which.

Figure 1:
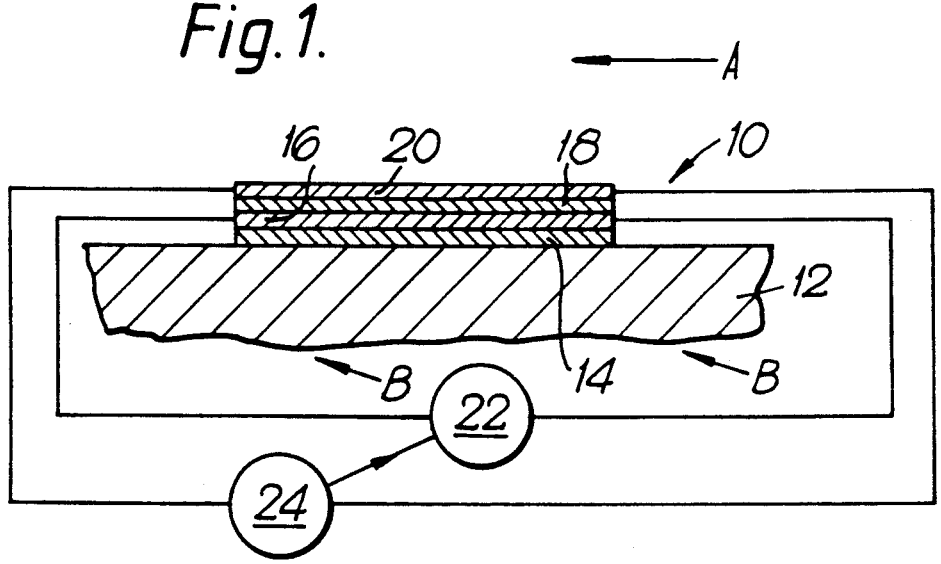
FIG. 1 is a cross-sectional view through a fluid temperature measuring device according to the present invention.

A fluid temperature measuring device 10 is shown in FIG. 1, and comprises a substrate 12 upon which is secured a first insulating layer 14. A first electrically conducting layer 16 is secured on the first insulating layer 14, a second insulating layer 18 is secured on the first electrically conducting layer 16 and a second electrically conducting layer 20 is secured on the second insulating layer 18.

The first electrically conducting layer 16 is a thin film metal resistance heating element of Nickel/Chromium which is electrically connected to an electrical power supply 22. The second electrically conducting layer 20 is a thin film metal resistance element of Nickel/Chromium which is electrically connected to an electrical resistance meter 24 which is recalibrated to indicate temperature.

The first and second insulating layers 14 and 18 are thin films of alumina.

The fluid temperature measuring device 10 is manufactured by firstly depositing a thin film of alumina 14 on the substrate 12. Secondly a thin film 16 of nickel/chromium is then deposited on the first insulating layer 14 by a sputtering technique. Thirdly a thin film of alumina 18 is deposited on the first electrically conducting layer 16, and finally a thin film 20 of nickel/chromium is then deposited on the second insulating layer 18 by a sputtering technique.

The insulating layers may alternatively be a polyimide resin, in which case the insulating layers are formed by a dipping technique or by a spraying technique.

The first and second electrically conducting layers may alternatively be thin films of nickel.

In operation the fluid temperature measuring device 10 is positioned in a fluid flow stream A, for example in the gas stream flowing through a compressor of a gas turbine engine. The second electrically conducting layer 20 is heated by the gas stream flowing through the compressor and the second electrically conducting layer 20 changes its resistance according to any temperature change of the gas stream. The second electrically conducting layer 20 responds quickly to temperature changes of the gas stream A because it is a thin layer which has low mass and low heat capacity. The temperature of the second electrically conducting layer 20 is indicated by the temperature calibrated resistance gauge 24. The first electrically conducting layer 16 is heated by passing a current through it. The electrical power supply 22 is arranged to supply sufficient current through the first electrically conducting layer 16 to maintain the first electrically conducting layer 16 at the same temperature as the second electrically conducting layer 20. The electrical power supply 22 is included in a servo control loop to maintain the first electrically conducting layer 16 at the same temperature as the second electrically conducting layer 20. The substrate 12 is cooled by supplying cooling air B onto the substrate 12, so that the substrate 12 is at a much lower temperature than the gas stream A such that the first electrically conducting layer 16 is cooled simply by reducing the power supplied by the electrical power supply 22. The effect of the insulating layers 14 and 18 and the first electrically conducting layer 16 is to screen the second electrically conducting layer 20 from the effect of the substrate 12 so that the heat transfer from the gas stream has only to raise the temperature of the second electrically conducting layer, not the substrate.

Figure 2:
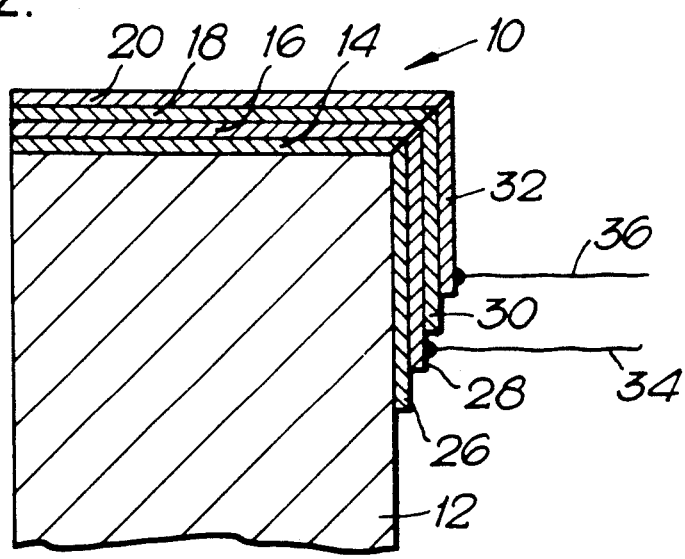
FIG. 2 is a cross-sectional view through an alternative embodiment of a fluid temperature measuring device according to the present invention.

In FIG. 2, the fluid temperature measuring device 10 of FIG. 1 is shown with an arrangement for connecting electrical wires to the thin electrically conducting layers 16 and 20. A surface of the substrate 12 adjacent to that 20 having the first insulating layer 12 secured thereto has a continuation 26 of the first insulating layer 14 deposited thereon. A continuation 28 of the first electrically conducting layer 16 is sputtered onto the continuation 26, a continuation 30 of the second insulating layer 18 is deposited on the continuation 28 and a continuation 32 of the second electrically conducting layer 20 is deposited on the continuation 30.

The continuations 26,28,30 and 32 of the layers 14,16, 18 and 20 terminate in a stepped manner so that a portion of each of the continuations 26,28 and 30 are exposed to allow a wire 34 to be bonded to the continuation 28 and a wire 36 to be bonded to the continuation 32. The wires 34 and 36 are bonded by a ball bonding technique or any other suitable technique.

Alternatively the wires 34 and 36 may be replaced by a low resistance thin film lead-out e.g. copper or gold.

The first electrically conducting layer may be a junction of two dissimilar metals which forms a peltier effect heater/cooler to heat or cool depending on the polarity of the current supplied by the electrical power source.

The second electrically conducting layer may be a junction of two dissimilar metals, e.g. nickel/chromium and nickel/aluminium, which forms one junction of a thermocouple such that changes in temperature produce changes in any electromotive force produced.

The fluid temperature measuring device may be made insensitive to the velocity of the fluid by suitable calibration. The fluid temperature measuring device may be shrouded, e.g. using a Keil shroud, to guide the fluid across it, to reduce its sensitivity to the direction of fluid flow, alternatively the unsteady flow direction may be measured and a correction is applied.

Figure 3:
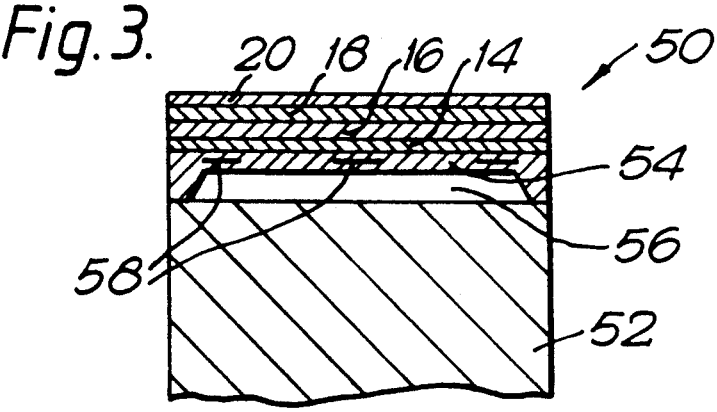
FIG. 3 is a cross-sectional view through a third embodiment of a fluid temperature measuring device according to the present invention.

In FIG. 3, a combined fluid temperature measuring device and fluid pressure measuring device 50 is shown. The device 50 comprises a support member 52 upon which is secured a substrate 54. The substrate 54 is formed from silicon and contains a number of strain gauge elements 58. The substrate 54 forms a diaphragm which is secured only at its edges to the support member 52, and an evacuated chamber 56 is formed between the substrate 54 and the support member 52. The silicon diaphragm 54 moves relative to the support member 52 due to changes in fluid pressure and the strain gauge elements 58 detect the pressure changes by detecting movements or strains in the silicon diaphragm 54.

The first insulating layer 14 of the fluid temperature measuring device is secured to the substrate 54.

An alternative method of manufacturing the fluid temperature measuring device is to use silicon micromachining techniques. If the device is fabricated from silicon the electrically conducting layers may be suitably doped silicon.

Thus the invention enables a temperature measuring device to be made which has a small mass for fast response to temperature changes, but which is supported by a mechanical structure which does not conduct heat from the temperature measuring device.

A further variation possible is to maintain the first electrically conducting layer 16 at the mean temperature of the second electrically conducting layer 20, i.e. the mean temperature of the gas stream A, rather than dynamically following the temperature of the second electrically conducting layer 20.

I claim:

1. A fluid temperature measuring device comprising a substrate,
   a first insulating layer secured to the substrate,
   a first electrically conducting layer secured to the first insulating layer,
   a second insulating layer secured to the first electrically conducting layer,
   a second electrically conducting layer secured to the second insulating layer, the second electrically conducting layer is arranged in operation to contact a fluid,
   heating means and cooling means arranged to heat or cool the first electrically conducting layer so that the first electrically conducting layer is maintained at substantially the same temperature as the second electrically conducting layer,
   an electrical characteristic measuring device is electrically connected to the second electrically conducting layer, the electrical characteristic measuring device detects temperature changes of the fluid by detecting corresponding changes of said electrical characteristic of the second electrically conducting layer.

2. A fluid temperature measuring device as claimed in claim 1 in which the first electrically conducting layer is electrically connected to an electrical source such that the first electrically conducting layer is heated by an electric current.

3. A fluid temperature measuring device as claimed in claim 2 in which the first electrically conducting layer comprises two joined dissimilar metals such that the first electrically conducting layer is heated by an electric current of one polarity and is cooled by an electric current of opposite polarity.

4. A fluid temperature measuring device as claimed in claim 1 in which a cooling means is arranged to cool the substrate to maintain the substrate at a temperature less than the minimum temperature of the fluid.

5. A fluid temperature measuring device as claimed in claim 4 in which cooling air is directed onto the substrate.

6. A fluid temperature measuring device as claimed in claim 1 in which the first electrically conducting layer is a thin metallic film.

7. A fluid temperature measuring device as claimed in claim 6 in which the thin metallic film comprises nickel/ chromium or nickel.

8. A fluid temperature measuring device as claimed in claim 1 in which the first and second insulating layers comprise thin alumina films.

9. A fluid temperature measuring device as claimed in claim 1 in which the first and second insulating layers comprise dipped polyimide resin.

10. A fluid temperature measuring device as claimed in claim 1 in which the second electrically conducting layer is a thin metallic film, the electrical characteristic measuring device detects temperature changes of the fluid by detecting corresponding changes of the electrical resistance of the second electrically conducting layer.

11. A fluid temperature measuring device as claimed in claim 10 in which the thin metallic film comprises nickel/ chromium or nickel.

12. A fluid temperature measuring device as claimed in claim 1 in which the second electrically conducting layer comprises a thin metallic film of two joined dissimilar metals which form one junction of a thermocouple, the electrical characteristic measuring device detects temperature changes of the fluid by detecting corresponding changes of the electromotive force produced by the junctions of the two dissimilar metals.

13. A fluid temperature measuring device as claimed in claim 1 in which the substrate comprises silicon.

14. A fluid temperature measuring device as claimed in claim 13 in which the substrate is a silicon diaphragm containing strain gauge elements, the substrate being secured to and defining an evacuated cavity with a support member, the silicon diaphragm moves relative to the support member due to change in pressure of the fluid, the strain gauge elements detecting the pressure of the fluid by detecting movement of the silicon diaphragm.

15. A fluid temperature measuring device as claimed in claim 1 in which the first and second insulating layers comprise silica.

16. A fluid temperature measuring device as claimed in claim 1 in which the first and second electrically conducting layers comprise doped silica.

17. A fluid temperature measuring device as claimed in claim 1 in which the first electrically conducting layer is arranged to be heated or cooled so that the first electrically conducting layer is maintained at the mean temperature of the second electrically conducting layer.

* * * * *